UNITED STATES PATENT OFFICE.

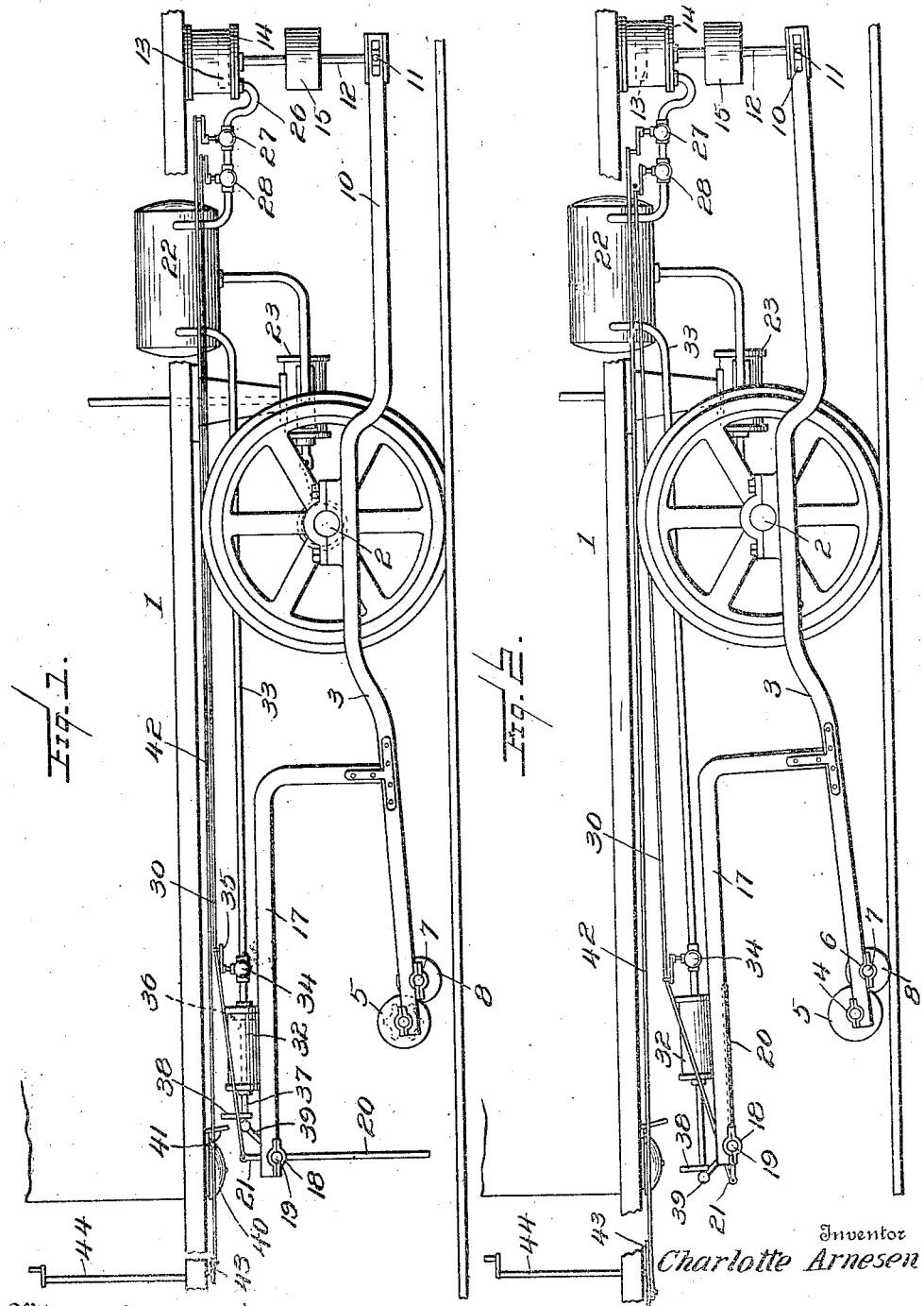

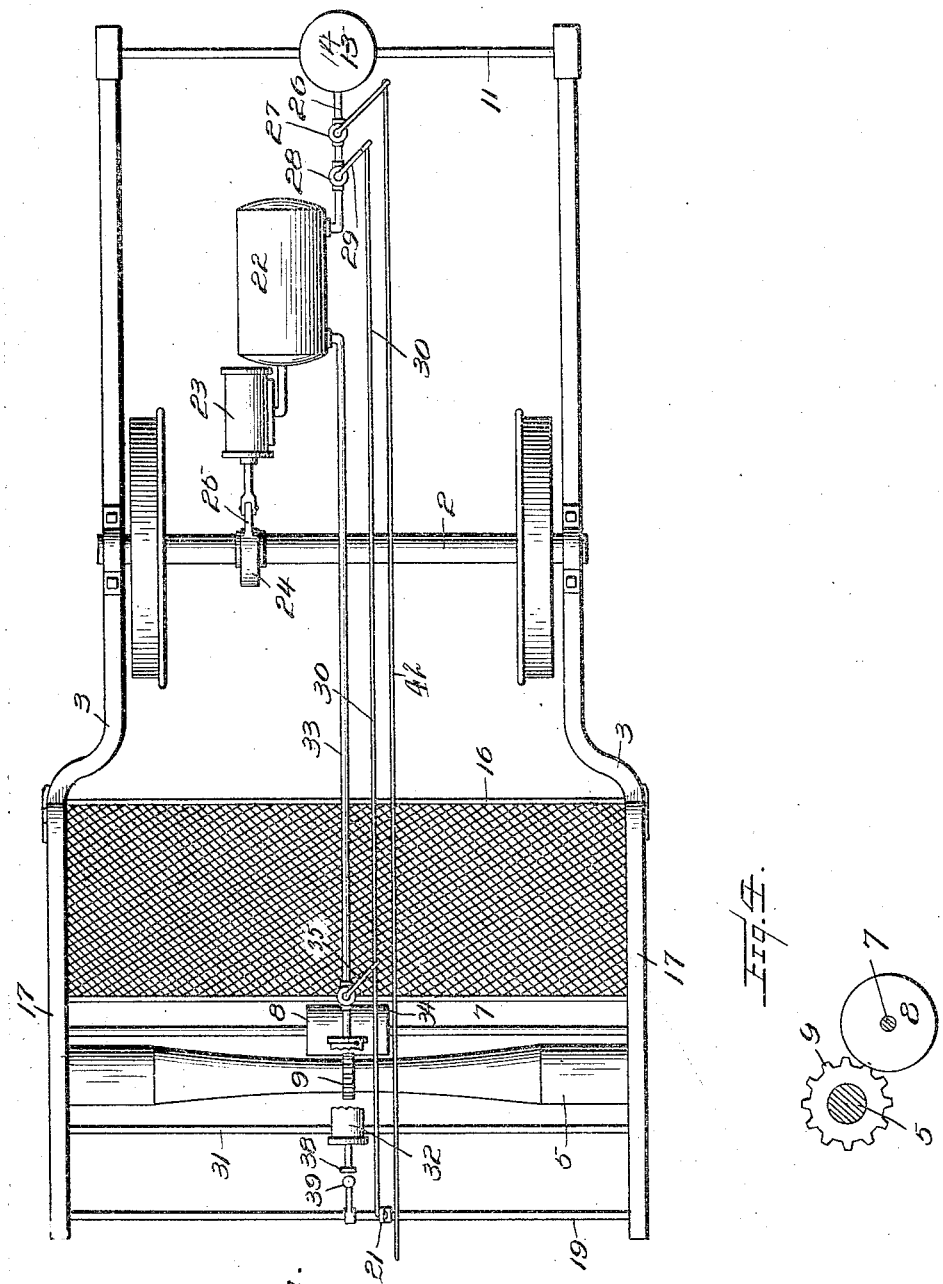

CHARLOTTE ARNESEN, OF PORTLAND, OREGON.

CAR-FENDER.

935,574.

Specification of Letters Patent. Patented Sept. 28, 1909.

Application filed March 16, 1909. Serial No. 483,684.

*To all whom it may concern:*

Be it known that I, CHARLOTTE ARNESEN, a citizen of Norway, residing at Portland, in the county of Multnomah and State of Oregon, have invented new and useful Improvements in Car-Fenders, of which the following is a specification.

This invention is an improved car fender which operates automatically when it encounters a body on the track to cause the fender to be lowered and pick up the body and prevent the body from being run over by the car and the said invention consists in the construction, combination and arrangement of devices hereinafter described, and claimed.

In the accompanying drawings:—Figure 1 is a side elevation of a portion of a railroad car provided with a fender and fender operating apparatus constructed in accordance with my invention showing the fender in initially raised position. Fig. 2 is a similar view showing the fender in lowered position. Fig. 3 is a plan of my improved fender and fender operating apparatus, the bottom of the car being omitted. Fig. 4 is a detail sectional view through the pick up rollers of the fender.

The floor of a car is indicated at 1 and one of the car axles is indicated at 2. On said axle is pivoted a pair of longitudinally disposed fender arms 3 provided at their front ends on their upper sides with bearings 4 for a roller 5 and on their under sides at a suitable distance from their front ends with bearings 6 for the shaft 7 of a roller 8 which roller is centrally disposed on the said shaft and is preferably made of rubber or other soft material. The roller 5 is concaved nearly from end to end and is provided at its central portion with a gear wheel 9 which at the side nearest the roller 8 bears frictionally against said roller, so that when the latter is turned in one direction, the roller 5 is caused to turn in the reverse direction. The arms 3 are provided at their rear ends, which extend rearwardly of the pivotal axle 2, with longitudinal slots 10 in which operate the ends of a cross bar 11, the said cross bar being connected to the lower end of a piston rod 12. The piston indicated at 13 in dotted lines, operates in a cylinder 14 which is vertically disposed and on the piston rod is a weight 15 which serves to normally depress the rear ends of the fender arms so as to raise the front ends of the fender arms and the rollers 5, 8, carried thereby. In rear of the rollers 5, 8, is a net 16 which is stretched between the arms 3 and serves to receive the person, animal or obstructing object on the track. A pair of arms 17 extend upwardly and forwardly from the fender arms 3 and are provided at their front ends with bearings 18 for a rock shaft 19. Said rock shaft has a releasing frame or other suitable releasing element 20 attached thereto and depending therefrom and extending across and above the track and the said rock shaft also has an arm 21 extending upwardly therefrom.

The car is provided with a suitable tank 22 which is supplied with compressed air by a pump 23, the plunger of the said pump being driven by an eccentric 24 and a suitable eccentric rod 25, the said eccentric being secured on the axle 2. The said air tank is connected by a pipe 26 to the cylinder 14 at a point below the piston 13 and said pipe is provided with a three-way relief valve 27 and a valve 28. The arm or lever 29 of the valve 28 is connected by a rod 30 to the rock arm 21. The arms 17 are connected by a suitable frame work or other suitable connections such as indicated at 31 and said frame work supports a cylinder 32 one end of which is connected by a flexible or swiveled pipe 33 to the air tank 22, the said pipe having a valve 34, the arm or lever 35 of which is connected to the rod 30 for operation by said rod. A piston 36 operates in the said cylinder and its rod 37 has a head 38 to engage the outer end of a rock arm 39 with which the rock shaft 19 is provided. When the releasing element 20 is in its normal vertical position as shown in Fig. 1, the rod 30 which is operated thereby holds the valve 28 and the valve 34 in closed position. A gong 40 is shown under the car provided with a tappet 41, which tappet is in the path of the piston head 38 so that when the said piston head moves it causes the gong to be sounded, as will be understood.

In the operation of the invention when a body is encountered on the track, it is struck by the releasing element 20 which releasing element turns rearwardly and causes the arm 21 to draw forwardly on the rod 30 so that said rod opens the valves 28 and 34. The valve 28 causes air to pass from the tank 22 into the lower portion of the cylinder 13 and raise the piston in said cylinder and hence cause the rear ends of the fender arms 10 to be drawn upwardly and the front ends of said fender arms to be depressed so that the roller 8 is brought forcibly into frictional contact with the road bed or pavement between the tracks. Hence the said roller 8 is caused to revolve by frictional contact with the road bed or pavement in the direction indicated by the arrow in Figs. 1 and 2 and the roller 5 being geared to the roller 8 as hereinbefore described. Said roller 5 is revolved in the reverse direction so that the upper side of said roller 5 moves rearwardly as indicated by the arrow in Figs. 1 and 2 and said roller 5 thereby throws the body uninjured onto the netting 16 of the fender. At the same time that the fender arms are thus operated the compressed air supplied to the cylinder 32 by the valve 34 causes the piston in said cylinder 32 to move forward and the head 38 by engagement with the arm 39 of the releasing element to swing the releasing element to an elevated horizontal position as shown in Fig. 2, and maintain said releasing element in such position out of the way and above the fender.

The valve 27 may be operated to release the air from the cylinder 14 to enable the piston 13 to return to its normal position by the action of the weight 15 and dispose the fender in its initial elevated position. Said valve 27 has a rod 42 connected thereto, the said rod being connected to a crank 43 at the lower end of a crank shaft 44 stationed on the front platform for operation by the motorman.

What is claimed is:—

1. The combination of a fender mounted for vertical movement, fluid pressure actuated means to operate the same, a movable releasing element in advance of the fender, fluid pressure actuated means to operate the releasing element, and means actuated by an initial movement of the releasing element, to put both the means for operating the fender and the means for operating the releasing element into operation.

2. The combination of a reservoir for fluid under pressure, a vertically movable fender, fluid pressure actuated means to operate the fender, a connection, including a valve, between said fluid pressure actuated operating means and the reservoir, a movable releasing element in advance of the fender, fluid pressure actuated means to operate the releasing element, a connection, including a valve, between said last-mentioned fluid pressure actuated means and the reservoir, and means, actuated by an initial movement of the releasing element to actuate said valves.

3. A pivotally mounted fender, means to raise and lower the same, a movable releasing element in advance of the fender and means controlled by said releasing element to actuate the means for raising and lowering the fender.

4. A car having a fender provided with arms pivotally mounted on one of the car axles, a releasing element carried by the fender, means to raise and lower the fender and means controlled by said releasing element to put the fender raising and lowering means in operation.

5. A car having a pivotally mounted fender, fluid pressure operated means to lower the fender, a releasing element, fluid-pressure-operating means to move the releasing element to and hold the same in an elevated position and means actuated by an initial movement of said releasing element to put the said fluid pressure operating means in operation.

In testimony whereof I affix my signature in presence of two witnesses.

CHARLOTTE ARNESEN.

Witnesses:
BERTHINE MATHISON,
FRED H. WHITFIELD.